(12) United States Patent
Goy et al.

(10) Patent No.: US 6,381,319 B1
(45) Date of Patent: Apr. 30, 2002

(54) APPARATUS FOR QUERYING A CENTRAL SERVICE

(75) Inventors: Philippe Jean Goy, Paris; Xavier Auguste Gabriel Le Camus, Langrune sur Mer; Josette Ledran, Longjumeau, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/701,746

(22) PCT Filed: Jun. 3, 1999

(86) PCT No.: PCT/FR99/01308

§ 371 Date: Dec. 4, 2000

§ 102(e) Date: Dec. 4, 2000

(87) PCT Pub. No.: WO99/63740

PCT Pub. Date: Dec. 9, 1999

(30) Foreign Application Priority Data

Jun. 3, 1998 (FR) .............................. 98 06963

(51) Int. Cl.[7] .............................................. H04M 17/00
(52) U.S. Cl. .............................. 379/144.08; 379/144.04
(58) Field of Search ..................... 379/114.15, 114.2, 379/143, 144.04, 144.05, 144.07, 144.08, 93.17, 93.23, 155

(56) References Cited

U.S. PATENT DOCUMENTS

| | | | |
|---|---|---|---|
| 5,218,633 A | | 6/1993 | Clagett et al. |
| 5,793,851 A | * | 8/1998 | Albertson .................... 379/114 |
| 5,937,037 A | * | 8/1999 | Kamel et al. ............ 379/88.19 |
| 6,163,598 A | * | 12/2000 | Moore ...................... 379/93.23 |
| 6,269,336 B1 | * | 7/2001 | Ladd et al. ............. 379/88.13 |
| 6,320,946 B1 | * | 11/2001 | Enzmann et al. .......... 379/143 |

FOREIGN PATENT DOCUMENTS

| | | |
|---|---|---|
| DE | 34 45 096 | 6/1986 |
| FR | 2 736 234 | 1/1997 |

* cited by examiner

*Primary Examiner*—Duc Nguyen
*Assistant Examiner*—Rexford N Barnie
(74) *Attorney, Agent, or Firm*—Young & Thompson

(57) ABSTRACT

An apparatus for querying a central service dials telephone numbers to establish contact with the central service, and accesses services housed in the central service. The geographical location of the apparatus is stored in a tie unit and sent to the apparatus upon request. The apparatus forwards this information to the central service that then provides information about facilities (e.g., restaurants, sports venues, theaters, etc.) at that location.

7 Claims, 2 Drawing Sheets

APPARATUS FOR QUERYING A CENTRAL SERVICE

BACKGROUND OF THE INVENTION

The present invention relates to an apparatus for interrogating a server center such as a telephone apparatus and is more particularly concerned with a public telephone apparatus, of the public payphone type.

Certain apparatuses of this type comprise means for dialing telephone numbers for establishing a telephone link with a server center plugged into a telephone network to which the apparatus is intended to be connected, and means for accessing services hosted in the server center, comprising means for navigating around said services and means for displaying the data supplied by said services and transmitted to the apparatus in response to an action on the navigating means.

This type of telephone apparatus makes it possible on the one hand to obtain a telephone link with a corresponding called party, and, on the other hand, to interrogate services in which are stored information relating, for example, to commercial establishments, such as hotels, restaurants, financial establishments, etc.

It is thus possible, for example, to ascertain the telephone numbers of these establishments, their availabilities and to make a reservation in a particularly simple manner, insofar as these apparatuses may be disposed on the public thoroughfare.

SUMMARY OF THE INVENTION

The aim of the invention is to provide an apparatus for interrogating a server center of the aforesaid type, capable furthermore of offering the user a selection of the information contained in the databases, as a function of the geographical area in which the apparatus is situated.

Its subject is therefore an interrogating apparatus- of the aforesaid type, characterized in that it includes means for transmitting to the server center information representative of the geographical location of the apparatus with a view to the selecting, from the said services, of data corresponding to the location of the apparatus.

The user can therefore be provided with very complete information concerning the geographical area in which he is situated.

The apparatus for interrogating a server center according to the invention can furthermore include one or more of the following characteristics taken in isolation or according to all technically possible combinations:

- the information representative of the geographical location of the apparatus being stored in a unit for tying the apparatus into a public payphone network, the apparatus includes means for sending a signal for instructing the dispatching, by the tie unit, of said information toward the telephone apparatus;
- the apparatus constitutes a public payphone intended to be plugged into a cabled telephone network and equipped with a reader of telecommunications payment chip cards, and includes means for effecting communication with a telephone set of a corresponding called party according to a first communication protocol and with the server center according to a second communication protocol, said protocols using distinct telecommunication channels;
- the second communication protocol is a communication protocol with a different tariff relative to the first communication protocol;
- said data supplied by the service including telephone numbers of corresponding parties situated in the geographical area of the apparatus, it includes means for selecting said numbers, plugged into means for automatically dialing selected numbers;
- said data supplied by the service include data chosen from among data relating to commercial establishments, meteorological data, data relating to sports news or cultural news and data adapted for calling personal or small-scale shared transport vehicles;
- the data supplied by the service include information relating to points of sale of telecommunications payment chip cards.

BRIEF DESCRIPTION OF THE DRAWINGS

Other characteristics and advantages will emerge from the following description, given merely by way of example and with reference to the appended drawings in which.

DESCRIPTION OF THE PREFERRED EMBODIMENTS

Figure 1:
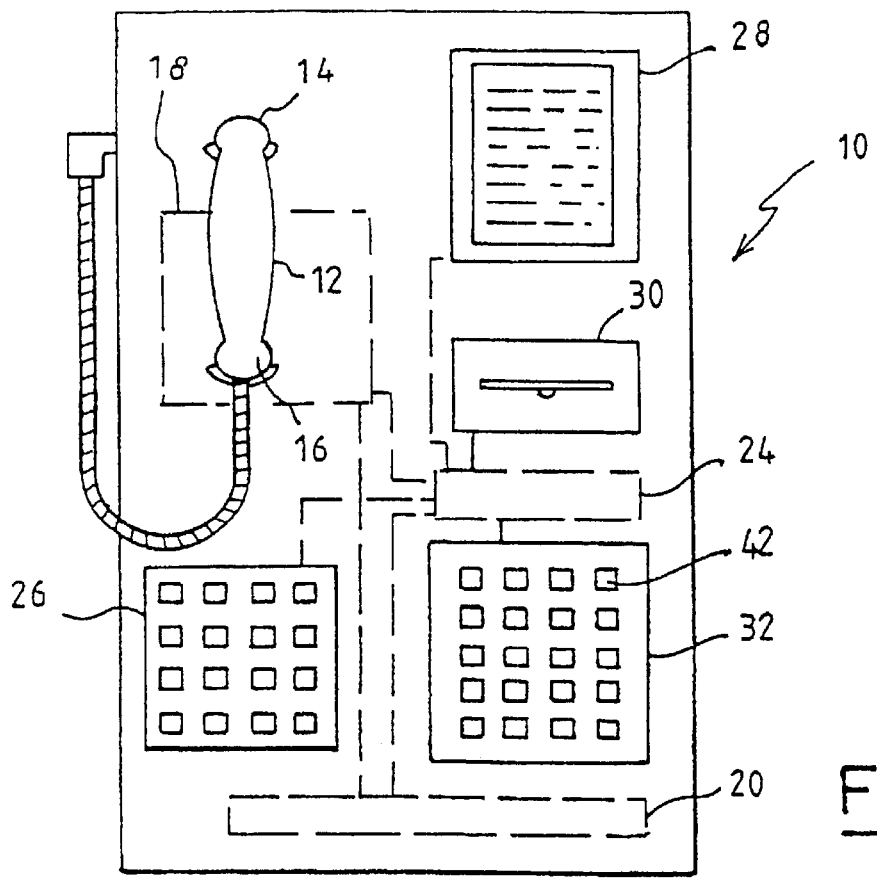
FIG. 1 is a face-on view of a telephone apparatus for interrogating a server center in accordance with the invention.

Represented in FIG. 1 is an apparatus for interrogating a server center in accordance with the invention, denoted by the general numerical reference 10 and consisting of a public payphone.

Of course, the invention applies equally to any other type of device capable of establishing a telephone link with the server, such as, for example, a microcomputer equipped with a modem.

The public payphone 10 includes a telephone handset 12 bearing, in a known manner, an earpiece 14 and a microphone 16.

Figure 2:
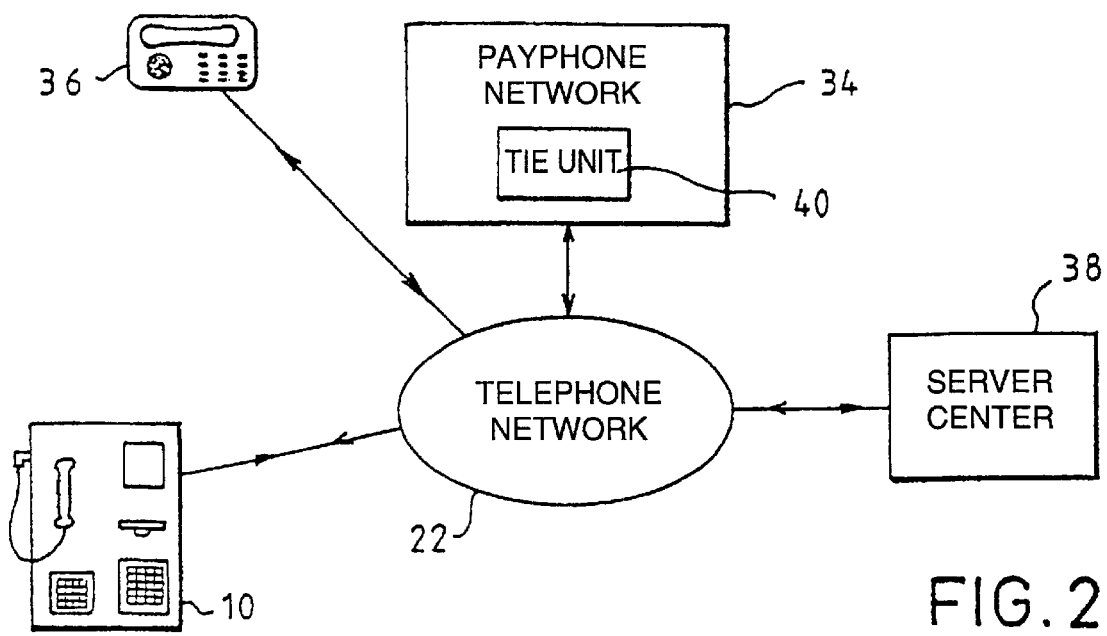
FIG. 2 is a schematic diagram showing, diagrammatically, the architecture of a telecommunications network using the telephone apparatus of FIG. 1.

As is conventional, to establish telephone communications with a party, the handset 12 is plugged into an internal telephony circuit 18, itself connected to an interface circuit 20 linked up with a cabled telephone network 22 (FIG. 2).

The telephone apparatus is furthermore furnished with a central drive unit 24 appropriate for the use envisaged, represented chain-dotted in FIG. 1, into which are plugged a keypad 26 for dialing telephone numbers, a display 28, a reader 30 of telephone communications payment chip cards, a second keypad 32 for accessing telematic services, such as will be described in detail subsequently, and the telephony circuit 18.

The central drive unit 24 is furthermore linked to the interfacing circuit 20 for effecting communication between it and the cabled telephone network 22.

With reference to FIG. 2, the apparatus 10 just described is intended to be put into communication on the one hand with a public payphone network 34 associated with the cabled telephone network 22 with a view to putting it into communication with a collection of telephone sets, such as 36, and on the other hand with a server center 38 which is plugged into the telephone network 22 and in which is hosted a collection of services enabling a user to obtain ordered information of various kinds, such as for example meteorological information, information concerning commercial establishments, such as hotels, restaurants, etc., information making it possible to call a personal transport vehicle, such as for example a taxi, or a small-scale shared transport vehicle, for example a minibus, or else sports information, etc.

As is conventional, the apparatus 10 is plugged into the public payphone network 34 by way of a tie unit 40.

Represented in FIG. 2 is a single apparatus 10, but the telecommunications network can of course be equipped with any number of such apparatuses plugged in in groups to several tie units 40, for example in groups of 100 apparatuses.

These apparatuses make it possible, on the one hand, to obtain a telephone communication with a telephone set 36 of a corresponding called party, and, on the other hand, to consult the services hosted in the server 38 and to do so as a function of the geographical location of the apparatuses 10.

To obtain a telephone communication with a telephone set 36, the telephone apparatus 10 according to the invention is used in a conventional manner by taking the handset 12 off the hook, by inserting a payment chip card into the reader 30 and then by dialing the telephone number of the corresponding party with the aid of the dialing keypad 26.

The consultation of one or more services or databases of the server 38 is carried out by inserting a payment chip card into the reader 30 then by selecting the desired service, from among the services presented on the display 28, by pressing a preprogrammed corresponding button, such as 42, of the second keypad 32, as well as a scrolling and selection buttons of this second keypad 32.

As will be described in detail subsequently, once the telephone link has been established with the server center 38, the apparatus 10 dispatches, toward the latter, information representative of its geographical location with a view to the selection, from the selected service, of the data corresponding to its location.

It will be noted that the selecting of a service from the second keypad 32 causes the automatic dialing, by the apparatus 10, of the call number of the server 38 which causes, in response, once the telephone link has been established, the displaying of the data of the service.

It will also be noted that the telephone link between the apparatus 10 and the telephone sets 36 and between the apparatus 10 and the server center 38 is effected under the control of the central drive unit 24 according to two distinct telecommunication protocols, namely, respectively, a protocol using a channel B of a "Numéris" network and a channel D of this Numéris network for dialog with the server center 38, which communication protocol using the D channel being a communication protocol with specific tariff, that is to say in which payment for telecommunications is made in the form of flat-rate charges.

Figure 3:
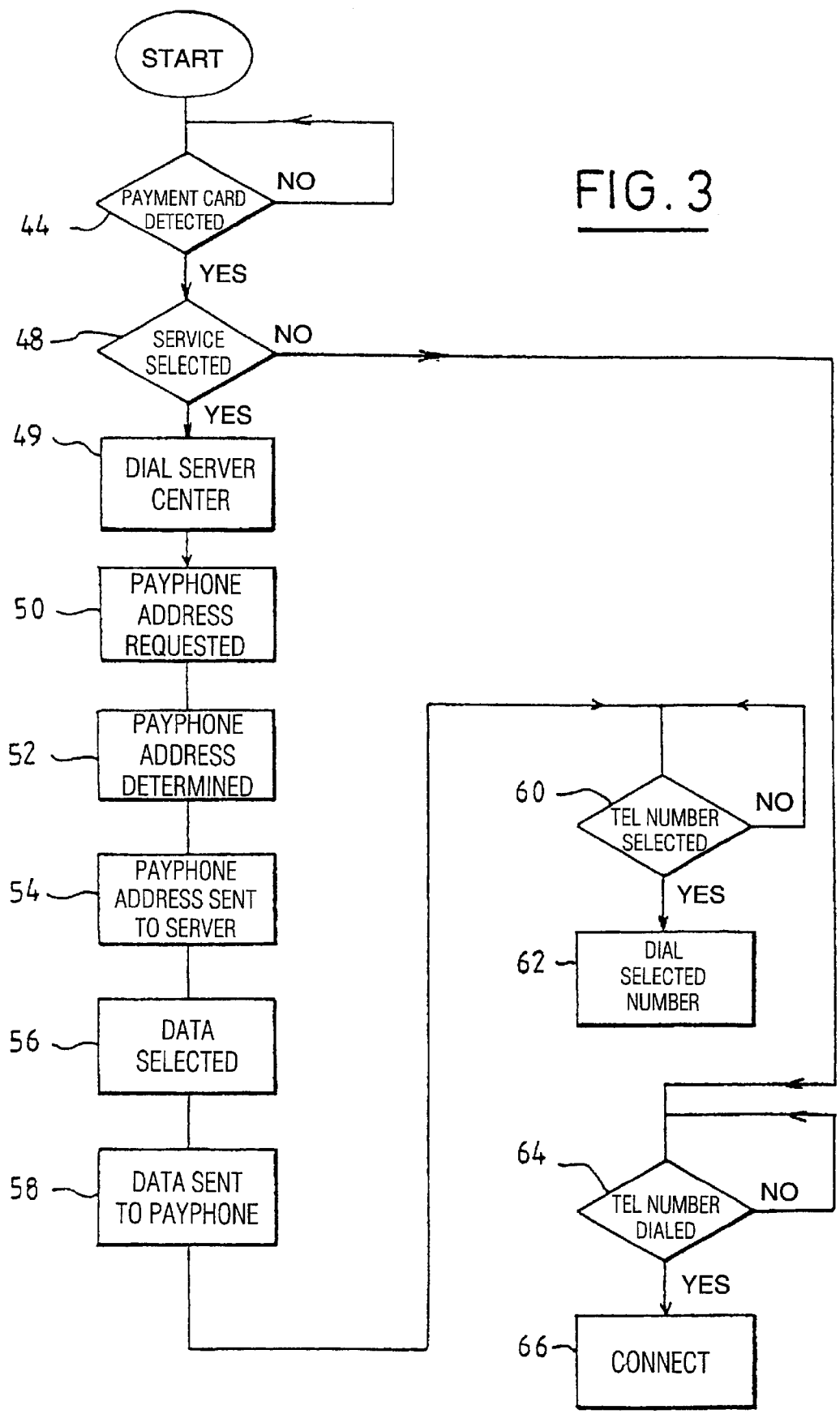
FIG. 3 is a flow chart showing the main phases of the operation of the apparatus in FIG. 1.

The description of the protocol for communication between the apparatus 10 and the server center 38 and between the apparatus 10 and one or more telephone sets 36 will now be given with reference to FIG. 3.

This protocol begins with a first step 44 in the course of which the apparatus 10 detects the presence of a chip card in the reader 30 for payment for access to the service.

In the course of the next step 48, the apparatus 10 monitors the state of the buttons 42 of the second keypad 32 so as to detect whether the user has depressed one of the buttons 42 corresponding to one of the services offered.

Following the depressing of a button 42, the central drive unit 32 causes at stage 49 the automatic dialing of the telephone number of the server center.

Following this step 49, the user has available all the information contained in the selected service and can navigate around the latter by selecting submenus with the help of scrolling and selection buttons of the second keypad 32.

However, and according to the invention, with the aim of supplying the user with very accurate information concerning the geographical area in which he is situated, in the course of the next step 50, that is to say if the user has depressed a button 42 for selecting one of the services, the server center 38 asks the apparatus 10 for the postal address of the zone in which he is situated, by dispatching a corresponding interrogation message thereto.

It should be noted that the address of each apparatus 10 is stored in the tie unit 40 to which it is linked so as to allow relatively easy replacement of the apparatuses 10.

Consequently, in the course of the next step 52, the central drive unit 24 causes the sending, toward the tie unit 40, of a signal for commanding the dispatching, by this unit, of information representative of a geographical location of the apparatus.

After receiving its address, the apparatus 10 dispatches this information to the server center 38 under the control of the central drive unit 24 (step 54).

During the next step 56, the server center 38 makes a selection of the data of each selected service in such a way as to dispatch, to the apparatus 10, only the information corresponding to the geographical area in which it is situated (step 58).

In the case where the data extracted from the selected service and displayed on the screen 28 include telephone numbers of corresponding parties, during the next step 60 the apparatus 10 verifies whether a telephone number has been selected.

If such is the case, the central drive unit 24 and the telephony circuit 18 perform the automatic dialing of this number with a view to establishing a telephone link with the corresponding party (step 62).

It will be noted, moreover, that if, during the previous step 48, no selection of services was made, during the next step 64 the apparatus 10 detects whether the user has dialed a telephone number manually on the first keypad 26.

If such is the case, during the next step 66 a corresponding telephone link is established, as is conventional.

It is appreciated that the invention just described makes it possible, on the one hand, to obtain a telephone link with a telephone set of a corresponding called party, and, on the other hand, to obtain a telephone link with a server center for consulting services and to do so as a function of the geographical location in which the apparatus 10 is situated.

Thus, the exact geographical location of the apparatus 10 being available to the server center 38, it is possible to obtain for example particulars concerning the location of the nearest commercial establishments, such as hotels, restaurants, to obtain, in real time, information relating to the availability of these establishments, and to be able to make a reservation particularly easily insofar as the apparatus makes it possible to obtain a telephone link with the latter.

It is also possible, by selecting an appropriate service, to obtain information concerning the list of the nearest points of sale of payment chip cards, to order personal transport vehicles, such as taxis, or small-scale shared transport vehicles, such as minibuses, to obtain sports information concerning the relevant geographical area and meteorological information.

Finally, it will be noted that it is possible to provide, on the keypad 32, additional selection buttons, allowing the selection of different geographical areas with a view to obtaining complementary information concerning one or more selected geographical areas.

The invention is not limited to the embodiment described.

In the foregoing it has, in fact been considered that the information concerning the geographical location of the public payphone, which is the subject of the invention, is obtained, by the server center, after action on one of the buttons for selecting services.

It would also be possible, as a variant, to provide for the sending, by the server center, of the interrogation signal once the telephone link between it and the telephone apparatus has been established.

What is claimed is:

1. Apparatus for interrogating a server center, comprising:

means (26, 42) for dialing telephone numbers for establishing a link with a server center (38) plugged into a telephone network (22) to which the apparatus is connected, and means (28, 32) for accessing services hosted in the server center (38) that includes means (32) for navigating around said services and means (28) for displaying data supplied by said services and transmitted to the apparatus in response to an action on the navigating means (32);

means (24) for transmitting to the server center information representative of a geographical location of the apparatus in order to enable selection by said apparatus (10), from said services hosted in the server center (38), data corresponding to the location of the apparatus (10);

the geographical location of the apparatus being stored in a unit (40) for tying the apparatus into a public payphone network (34), the apparatus further comprising means (24) for sending a signal for instructing the dispatching, by the tie unit (40), of said information to the apparatus.

2. The apparatus according to claim 1, constituted by a public payphone (10) plugged into a cabled telephone network (22) and equipped with a reader (30) of telecommunications payment chip cards, and further comprising means (18, 20, 24) for effecting communication with a telephone set of a corresponding called party according to a first communication protocol and with the server center (38) according to a second communication protocol, said protocols using distinct telecommunication channels.

3. The apparatus according to claim 1, wherein said data supplied by said services includes telephone numbers of corresponding parties situated in the geographical area of the apparatus, and wherein the apparatus includes means (32) for selecting said numbers, plugged into means (18, 24) for automatically dialing selected numbers.

4. The apparatus according to claim 1, wherein said server center accesses databases chosen from the group of databases consisting of commercial establishments, meteorological data, sports news, cultural news, and transport vehicles.

5. The apparatus according to claim 3, wherein the apparatus further comprises a means for accessing a database that includes information relating to points of sale of telecommunications payment chip cards.

6. A system for interrogating a server center, the system comprising:

a telephone for dialing a telephone number of a server center that is connected to a telephone network to which said telephone is connected, said telephone also being part of a payphone network, said telephone including a selector and a display that access information from the server center;

a tie unit that connects the payphone network to the telephone network and stores a geographical location of said telephone; and said telephone including a central drive unit that requests the location of said telephone from said tie unit and forwards the location to the server center, which responsively provides to said telephone information related to the location.

7. A system for interrogating a server center, the system comprising:

means for dialing a telephone number of a server center that is connected to a telephone network to which said means for dialing is connected, said means for dialing also being part of a pay-for-service network, said means for dialing including selection and display means for accessing information from the server center;

a tie unit that connects the pay-for-service network to the telephone network and stores a geographical location of said means for dialing; and said means for dialing including central drive means for requesting the location of said means for dialing from said tie unit and forwarding the location to the server center, which responsively provides to said means for dialing information related to the location.

* * * * *